Jan. 3, 1956    A. BECHLER    2,729,522
BEARINGS
Filed Dec. 27, 1951

Inventor
André Bechler
by Karl Michaelis, atty

United States Patent Office 2,729,522
Patented Jan. 3, 1956

2,729,522
BEARINGS

Andre Bechler, Moutier, Switzerland

Application December 27, 1951, Serial No. 263,597

Claims priority, application Switzerland
December 29, 1950

3 Claims. (Cl. 308—240)

This invention relates to bearings and more especially to the bearings supporting the cam shafts of lathes or other machine tools.

Every bearing must afford some play for the purpose of lubrication. If the tolerance allowed for the machined workpieces is one or at the most a few thousandths of a millimeter, it is imperative to eliminate the faults which might be due to the play in the bearing located near the cams, for owing to practical reasons this play will always have to be of the order of one or several hundredths of a millimeter.

The present invention is particularly concerned with bearings of machine tools in which the pressure exerted on the bearing by the shaft mainly acts on the bottom section of the active bearing surface.

In order to improve the bearing, the bottom of its sliding surface presents a number of grooves, which considerably reduce the supporting surface and acts towards materially increasing the specific pressure. It is thus possible to reduce the thickness of the film of oil existing between this part and the surface of the cam or other shaft to a strict minimum and to thereby render the film thickness independent from the operating conditions (speed of rotation of the shaft supported by the bearing, temperature) of the bearing. Thus the lubricating oil cannot be any more a source of reduced precision.

In the drawing affixed to this specification and forming part thereof an embodiment of the invention is illustrated diagrammatically by way of example.

In the drawing

Figure 1:
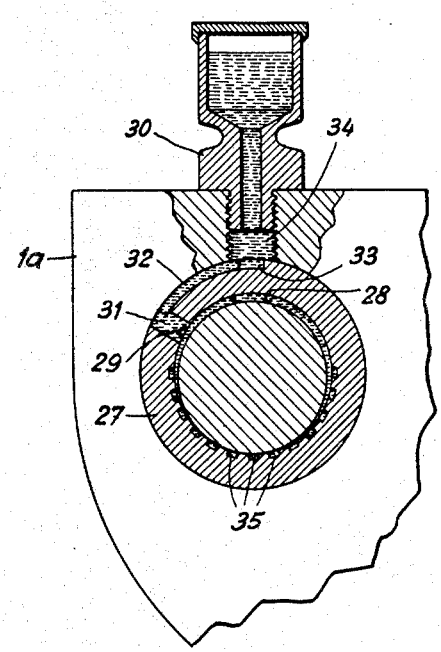
Fig. 1 is a view, partly in cross-section of the cam shaft bearing of a lathe or other machine tool.
Figure 2:
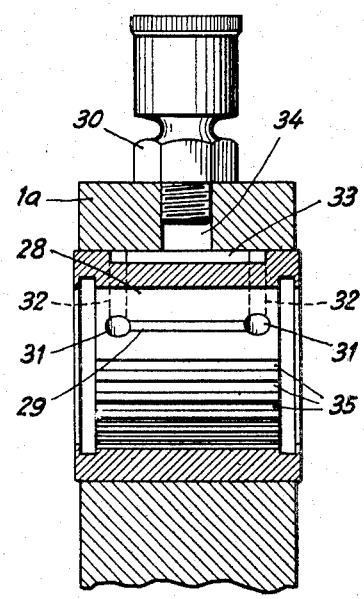
Fig. 2 is a longitudinal section of the bearing shown in Fig. 1.
Figure 3:
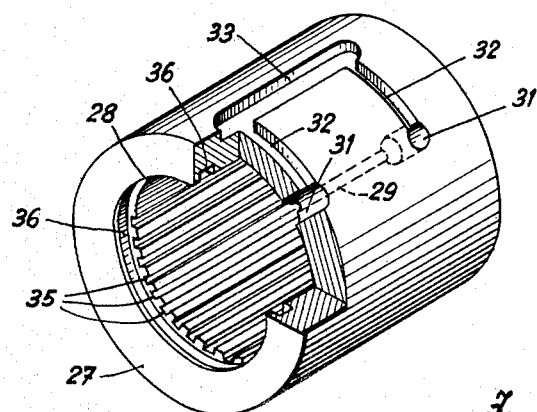
Fig. 3 is a perspective view of the bearing box.

Referring to the drawing, numeral 27 designates the box of a journal bearing, the box having the form of a hollow cylinder fixed in a bore of a projecting part 1a of a machine tool bed and being made of a metal or alloy suitable for this type of bearing. In the embodiment of the invention shown in the drawing a first part of the inner surface 28 of the box 27 is provided with a longitudinal groove or recess 29 for supplying the lubricating oil into the clearance between the shaft and the interior surface of the bearing box. This recess is connected to the oil reservoir, here shown as an oiler 30, by way of radial borings 31 of which there is one at each end of the recess 29, circumferential and longitudinal conduits 32 and 33, respectively, and a bore 34 in the part 1a, partly screw-threaded, into which the oiler 30 is screwed.

In the device according to the invention, contrary to conventional arrangements the specific pressure exerted by the shaft on a second part of the surface 28 which part is diametrically opposed to the first part is increased in order to reduce the thickness of the oil film supporting the shaft as much as possible. While in conventional bearings the thickness of this film varies in accordance with varying operating conditions (speed and oil temperature), this variation amounting to at least several thousandths of a millimeter, no such variations occur in the illustrated bearing due to the fact that the second or bottom part of the inner surface 28 of the box—the sliding surface—is provided with a plurality of axial grooves 35. The side walls of the grooves 35 extend substantially at a right angle and radially from the bearing surface for scraping the oil into the grooves. The part of the interior of the bearing surface of the box 27 between the recess 29 and the grooves 35 is not interrupted by grooves or the like, i. e. is continuous. An oil receiving means is provided at each end of the grooves 35 for receiving the oil scraped into the grooves. These receiving means are in the form of annular grooves 36 cut into the bearing surface 28.

This arrangement of grooves is contrary to conventional arrangements in which the oil conduits are so constructed that the dynamic oil pressure and the thickness of the shaft supporting oil film are increased.

Numerous conclusive tests have shown that in a plane bearing lightly loaded with a slowly revolving shaft there is no rupture of the oil film caused by the measures here described. These measures avoid by a considerable reduction of thickness of the oil film, any movements of the shaft section supported by the bearing in the direction of the load when the conditions of running of the shaft should vary. Therefore inaccuracies caused by such movements are avoided.

I wish it to be understood that I do not desire to be limited to the details described in this specification and illustrated in the drawings, for obvious modifications will occur to a person skilled in the art.

I claim:

1. A bearing for the support of a cam shaft of a machine tool comprising a bearing box having a bore forming a bearing surface, a substantially axial lubricating oil supply recess in a first part of said bearing surface, lubricating oil supply means connected with said recess for supplying lubricating oil into said recess, a plurality of substantially axial lubricating oil removal grooves in a second part of said bearing surface which second part is diametrically opposed to said first part, said grooves having side walls extending substantially at a right angle and radially from said bearing surface for scraping the oil into said grooves, the part of said bearing surface between said recess and said grooves being continuous, and an oil receiving means at each end of said grooves for receiving the oil scraped into said grooves.

2. A bearing as defined in claim 1 in which said lubricating oil supply means are connected with each end of said recess.

3. A bearing as defined in claim 1 in which said oil receiving means are in the form of annular grooves cut into said bearing surface.

References Cited in the file of this patent

UNITED STATES PATENTS

| Number | Name | Date |
|---|---|---|
| 314,079 | Thayer et al. | Mar. 17, 1895 |
| 634,204 | Diehl | Oct. 3, 1899 |
| 671,314 | Edison | Apr. 2, 1901 |
| 1,664,878 | Flintermann | Apr. 3, 1928 |
| 1,794,623 | Jones | Mar. 3, 1931 |
| 2,023,764 | Hawarth | Dec. 10, 1935 |
| 2,537,386 | Wikstrom | Jan. 9, 1951 |
| 2,539,072 | Gordon et al. | Jan. 23, 1951 |
| 2,566,080 | Davids | Aug. 28, 1951 |
| 2,673,767 | Schoeppner | Mar. 30, 1954 |

FOREIGN PATENTS

| Number | Country | Date |
|---|---|---|
| 510,791 | Great Britain | Aug. 8, 1939 |
| 668,079 | France | Oct. 28, 1929 |